(12) United States Patent
Winch (10) Patent No.: US 7,551,412 B2
(45) Date of Patent: Jun. 23, 2009

(54) WIRING FAULT CORRECTION CIRCUIT

(75) Inventor: Peter Winch, Raleigh, NC (US)

(73) Assignee: Electronic Systems Protection Inc., Zebulon, NC (US)

( * ) Notice: Subject to any disclaimer, the term of this patent is extended or adjusted under 35 U.S.C. 154(b) by 366 days.

(21) Appl. No.: 11/429,435

(22) Filed: May 8, 2006

(65) Prior Publication Data

US 2006/0268472 A1  Nov. 30, 2006

Related U.S. Application Data (60) Provisional application No. 60/678,818, filed on May 9, 2005.

(51) Int. Cl.
*H02H 9/08* (2006.01)
*H02H 9/00* (2006.01)
*H02H 3/00* (2006.01)
*H02H 3/22* (2006.01)
*H01H 50/54* (2006.01)
*H01H 11/00* (2006.01)

(52) U.S. Cl. .............................. 361/42; 361/54; 361/56; 361/57; 361/58; 361/84; 361/86; 361/111; 361/245; 361/246

(58) Field of Classification Search ........................ None
See application file for complete search history.

(56) References Cited

U.S. PATENT DOCUMENTS

| | | | |
|---|---|---|---|
| 3,273,039 A | 9/1966 | Godshalk et al. | |
| 3,413,487 A | 11/1968 | Gershen | |
| 3,600,662 A | 8/1971 | Anwander | |
| 3,626,201 A | 12/1971 | Chambers, Jr. | |
| 3,731,179 A | 5/1973 | Rademaker | |
| 3,947,859 A | 3/1976 | Menmuir et al. | |
| 3,961,319 A | 6/1976 | Asberry | |
| 4,180,746 A | 12/1979 | Giuffra | |
| 4,224,529 A | 9/1980 | Fujiwara | |
| 4,492,878 A | 1/1985 | Hamel | |
| 4,527,111 A | 7/1985 | Branham | |
| 4,843,515 A | 6/1989 | Richman | |
| 4,855,662 A | 8/1989 | Yang | |
| 5,045,670 A | 9/1991 | Gilliland | |
| 5,136,455 A | 8/1992 | Billingsley | |
| 5,173,587 A | 12/1992 | Nakano et al. | |
| 5,179,490 A | 1/1993 | Lawrence | |
| 5,260,606 A | 11/1993 | Young | |
| 5,709,532 A | 1/1998 | Giamati et al. | |

(Continued)

*Primary Examiner*—Albert W Paladini
*Assistant Examiner*—Dharti H Patel
(74) *Attorney, Agent, or Firm*—Edell, Shapiro & Finnan, LLC (57) ABSTRACT

A wiring fault correction circuit for determining wiring conditions of an AC supply system includes: input line and neutral conductors connectable to the AC supply system; output line and neutral conductors connectable to a load; first, second, third, and fourth single pole, single throw relays; a first driver circuit for controlling the first and second single pole, single throw relays to respectively connect the input line conductor to the output line conductor and the input neutral conductor to the output neutral conductor in response to a correctly wired AC supply system; and a second driver circuit for controlling the third and fourth single pole, single throw relays to respectively connect the input line conductor to the output neutral conductor and the input neutral conductor to the output line conductor in response to an incorrectly wired AC supply system in which line and neutral conductors are reversed.

11 Claims, 4 Drawing Sheets

U.S. PATENT DOCUMENTS

| | | | |
|---|---|---|---|
| 5,721,661 A | 2/1998 | Mechanic | |
| 5,737,168 A | 4/1998 | Baker | |
| 5,907,193 A * | 5/1999 | Lumbis | 307/9.1 |
| 6,028,431 A | 2/2000 | Hashida | |
| 6,040,969 A * | 3/2000 | Winch et al. | 361/82 |
| 6,246,558 B1 | 6/2001 | DiSalvo | |
| 6,262,492 B1 | 7/2001 | Sheng | |
| 6,366,208 B1 | 4/2002 | Hopkins et al. | |
| 6,437,953 B2 | 8/2002 | DiSalvo | |
| 6,617,838 B1 * | 9/2003 | Miranda et al. | 324/117 R |
| 6,771,152 B2 | 8/2004 | Germain et al. | |
| 6,804,096 B2 | 10/2004 | Nagata | |
| 6,813,126 B2 | 11/2004 | DiSalvo et al. | |
| 6,850,073 B2 | 2/2005 | Elms et al. | |
| 6,864,766 B2 | 3/2005 | DiSalvo et al. | |
| 2001/0036049 A1 | 11/2001 | DiSalvo et al. | |
| 2002/0071228 A1 | 6/2002 | Campolo et al. | |
| 2002/0194547 A1 | 12/2002 | Christensen et al. | |
| 2002/0196109 A1 | 12/2002 | DiSalvo et al. | |
| 2003/0189804 A1 | 10/2003 | Kampmeyer | |
| 2004/0070474 A1 | 4/2004 | Wu et al. | |
| 2004/0174173 A1 | 9/2004 | Elms et al. | |
| 2004/0196600 A1 | 10/2004 | DiSalvo et al. | |
| 2004/0246003 A1 | 12/2004 | Bryndzia et al. | |
| 2004/0252430 A1 | 12/2004 | Oumaru et al. | |
| 2004/0257725 A1 | 12/2004 | Chan et al. | |
| 2004/0264078 A1 | 12/2004 | Chan et al. | |
| 2005/0030685 A1 | 2/2005 | Disalvo | |
| 2005/0047035 A1 | 3/2005 | Vallinmaki et al. | |

* cited by examiner

WIRING FAULT CORRECTION CIRCUIT

CROSS-REFERENCE TO RELATED APPLICATION

This application claims priority to U.S. Provisional Application No. 60/678,818, filed May 9, 2005 and titled "Power Correction Circuit," the entire contents of which are incorporated herein by reference.

FIELD OF THE INVENTION

The present invention relates to a wiring fault correction circuit for protecting electronic equipment from disruptive or damaging voltage or current from an AC supply source, and more particularly, to a circuit for detecting and correcting a faulty wiring condition in which the line and neutral conductors of an AC supply are interchanged.

BACKGROUND

When supplying power to a load via an AC power supply system, it is helpful to know whether the AC power supply is wired correctly (e.g., whether the line, neutral, and ground terminals of the supply are properly connected). Plugs of power-sensitive electrical/electronic equipment have standardized configurations to mate with AC power supply sockets, such that the line and neutral terminals of the 120 Vrms supply system can be connected only to the line and neutral leads of the equipment, respectively. However, it is not uncommon for the line and neutral conductors of an AC power outlet to be wired in a configuration that is the reverse of the indicated arrangement, with 120 Vrms being supplied at the neutral terminal of the power outlet instead of the line terminal of the power outlet. Under such interchanged conditions, the line-to-ground and neutral-to-ground common mode paths are effectively reversed, which, if not properly accounted for in the design of the power filter circuit, creates a risk of excessive leakage current or inadequate EMI protection, as well as causing operational difficulties in the connected equipment. Consequently, devices that alert a user to a reversed wiring condition in the AC supply system can be useful in power filter circuits. However, such devices do not automatically correct reversed wiring conditions. Thus, more complicated or expensive power filter circuit designs are typically required to account for the possibility of a wiring fault condition, such as a reversed line and neutral arrangement.

One approach to designing AC power filter circuits to address potential wiring faults is simply to assume that the 120 Vrms signal may be present on either the line or neutral conductor of the AC power supply. Most prior art AC power filtering circuits generally use an impedance network relying largely on capacitors to suppress common mode interference. Because of the possibility of having 120 Vrms between any two conductors, these devices must use relatively small capacitors between all of the conductors, including the neutral and ground conductors, to meet UL leakage current requirements. Further, these power filter circuits conventionally include clamping devices, such as varistors, connected between each pair of conductors (e.g., in parallel with the capacitors). Below their rated voltage, these clamping devices are non-conductive, thereby presenting an open circuit. Above their rated voltage, these clamping devices conduct, thereby creating a short circuit designed to prevent transients above the rated voltage from reaching the connected electronic equipment. Once again, however, because of the possibility of having 120 Vrms between any two conductors, all of the clamping devices, including the clamping device connected between the neutral and ground conductors, must be rated for more than 120 Vrms. This results in an arrangement that can, at best, suppress neutral-to-ground disturbances to about 200 V and, when subject to the high transient energy levels that often occur on the 120 Vrms supply system, may allow up to 500 V or more to reach connected equipment. For sensitive equipment, this can lead to disruption or damage. Thus, because of the risk of a reversed line-neutral condition, these devices provide relatively poor common mode suppression of low frequency interference between the neutral and ground conductors and relatively poor common mode suppression of transients between the neutral and ground conductors.

Another proposed solution to addressing reversed wiring conditions (i.e., interchanged line and neutral terminals) is to use a switching circuit that includes a double pole, double throw (DPDT) relay adapted to connect the input (AC supply) and output (load) line and neutral conductors in accordance with the output of a wiring fault sensing circuit. When the wiring fault sensing circuit detects that the supply system circuit has all three conductors connected and the AC signal (120 Vrms) is present on the line conductor, the DPDT relay respectively connects the input line and neutral conductors to the output line and neutral conductors. Conversely, when the wiring fault sensing circuit detects that the line and neutral conductors of the AC power supply system have been interchanged, the DPDT relay switches states to connect the input line conductor to the output neutral conductor and to connect the input neutral conductor to the output line conductor, such that the 120 Vrms appears at the output line conductor. Accordingly, the correctly wired signal is passed to the connected equipment.

Theoretically, the above-described DPDT circuit would seem to address many of the noted existing problems. However, available DPDT relays are not designed to handle the current requirements of a power filter circuit. In particular, no commercially available DPDT can handle 20 amps in both the normally open and normally closed positions. For example, many DPDT relays are rated for 20 amps for a normally open circuit, but rated for only 10 amps for a normally closed circuit. To employ a DPDT relay in the manner proposed, a 20 amp rating would be required for both the normally open and normally closed cases. Thus, commercially available and affordable DPDT relays do not provide a workable solution for correcting reversed wiring conditions.

Another contemplated solution is to use two double pole, single throw (DPST) relays controlled by a wiring fault sensing circuit. However, a coordination problem between the relays arises when the switching signal is applied to the relay. In theory, when the switching signal is applied to a relay, the relay cleanly switches from one position to another. In practice, however, there is a delay time between signal application and actual relay switching, and timing differences between the two DPST relays can result in brief short circuits that may potentially damage equipment. Further, the strong springs used in relays designed to handle substantial currents may cause the relays to experience some mechanical bounce at the time of switching, such that the relays may briefly switch back and forth between contact positions, resulting in temporary short circuit conditions. Thus, DPST relays do not provide a consistent, reliable solution to correcting wiring faults of AC power supply systems.

Consequently, there remains a need for a wiring fault correction circuit that corrects a reverse AC supply line-neutral wiring condition consistently, cost-effectively, and in compliance with UL requirements. Additionally, it is desirable that such a wiring fault correction circuit be capable of being included in a cost-effective power filter circuit that meets UL requirements under reverse supply wiring conditions.

SUMMARY

In accordance with an exemplary embodiment of the present invention, a wiring fault correction circuit for determining wiring conditions of an AC supply system comprises: input line and neutral conductors that can be couple to the AC supply system; output line and neutral conductors that can be coupled to a load; a first driver circuit for controlling first and second single pole, single throw relays to respectively connect the input line conductor to the output line conductor and the input neutral conductor to the output neutral conductor in response to a correctly wired AC supply system; and a second driver circuit for controlling third and fourth single pole, single throw relays to respectively connect the input line conductor to the output neutral conductor and the input neutral conductor to the output line conductor in response to an incorrectly wired AC supply system in which line and neutral conductors of the AC supply system are reversed. In this manner, the AC voltage signal is always supplied to the load on the on the output line conductor regardless of whether the AC supply system is wired correctly (with the AC voltage signal on the line conductor) or incorrectly (with the AC voltage signal on the neutral conductor). Each of the four single pole, single throw relays is independent of the others in the sense that each relay is uniquely associated with one input-to-output connection (i.e., line-to-line, neutral-to-neutral, line-to-neutral, and neutral-to-line connections), and the state of each relay affects only its associated input-output connection and not the other relays or their associated input-output connections. Thus, the aforementioned problems with double pole, double throw relays and double pole, single throw relays are avoided. Such a wiring fault correction circuit meeting UL requirements can be constructed cost-effectively.

The first driver circuit can include a first switching device that energizes relay coils of the first and second single pole, single throw relays in response to an AC voltage signal on the input line conductor. Likewise, the second driver circuit can include a second switching device that energizes relay coils of the third and fourth single pole, single throw relays in response to a 120 Volt AC signal on the input neutral conductor. The first driver circuit can further include a first voltage divider circuit connected between the input line conductor and ground for activating the first switching device to energize the relay coils of the first and second single pole, single throw relays in response to a 120 Volt AC signal on the input line conductor, and the second driver circuit can further include a second voltage divider circuit connected between the input neutral conductor and ground for activating the second switching device to energize the relay coils of the third and fourth single pole, single throw relays in response to a 120 Volt AC signal on the input neutral conductor. The switching devices can be, for example, optical isolator circuits, such as photomos relays, or other switches devices that provide relatively good isolation and high gain.

According to a specific implementation, the first driver circuit can include: a first diode, a first resistor, and a first capacitor connected in series between the input line conductor and ground; a switching device such as a photomos relay having first and second input terminals connected in parallel with the first capacitor and an output terminal coupled to relay coils of the first and second single pole, single throw relays; and a second resistor connected at one end between the first resistor and the first capacitor and at the other end to the first input terminal of the switching device, wherein the first diode, first capacitor, and first and second resistors supply a leakage current that activates the switching device in response to a 120 Volt AC signal on the input line conductor, whereby the switching device activates the first and second single pole, single throw relays. The second driver circuit can be constructed in a similar manner, except that the components are connected between the input neutral conductor and ground and the switching device activates the third and fourth single pole, single throw relays. A second diode and third resistor connected in series between the input line conductor and the switching circuits can provide a supply voltage signal to the switching circuits.

The wiring fault correction circuit can constitute a stage of an AC power filter circuit which further includes: a diverter stage that suppresses transient overvoltages; a filtering stage that suppresses electromagnetic interference; a sensing circuit and switch circuit that determine and indicate whether each of the line, neutral and ground connectors of the AC supply system is connected and whether an AC voltage signal is present on the output line conductor; and a clamping stage that suppresses residual voltage transients.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

A wiring fault correction circuit of the present invention detects and corrects reverse wiring conditions of an AC supply system circuit. Such a wiring fault correction circuit includes four independent single throw, single pole relays. By using such relays, prior art problems, such as switch bouncing, UL requirements, current draw, and relay ratings, are eliminated.

Figure 1:
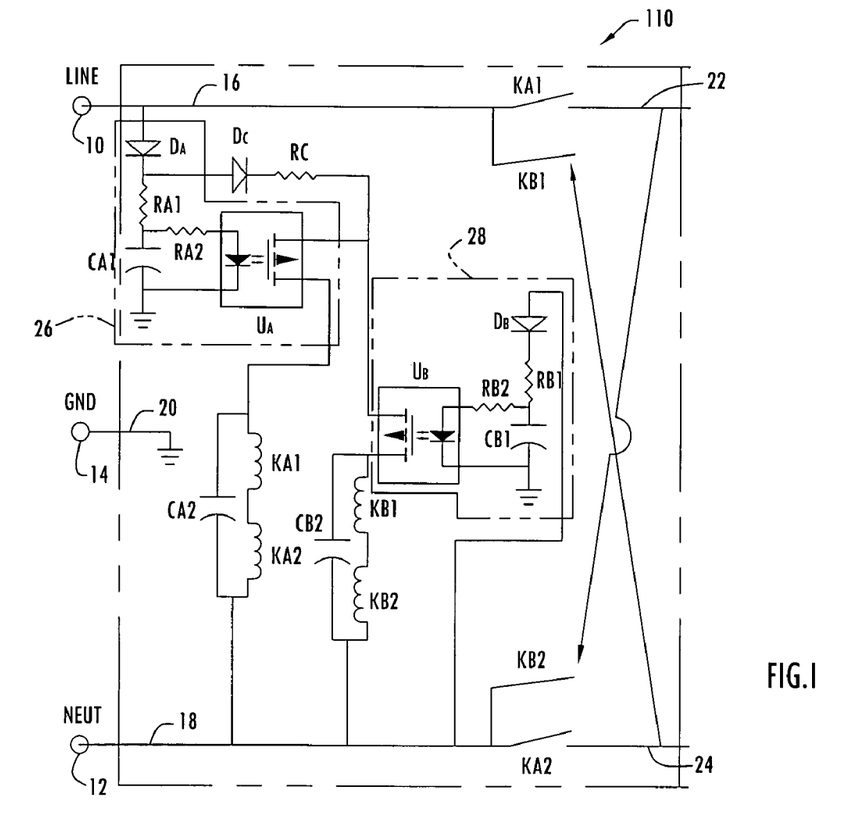
FIG. 1 is a schematic circuit diagram of a wiring fault correction circuit according to an exemplary embodiment of the present invention.

Referring to FIG. 1, a wiring fault correction circuit 110 according to an exemplary embodiment of the present invention senses whether an AC supply system circuit is properly connected with the correct line-neutral wiring. Circuit 110 includes an input line terminal 10, an input neutral terminal 12, and an input ground terminal 14 that are respectively configured to connect to line, neutral, and ground terminals of an AC supply system. For example, terminals 10, 12, and 14 can be three prongs of a plug that can be inserted into an AC socket. Input line, neutral, and ground terminals 10, 12, and 14 are respectively coupled to an input line conductor 16, an input neutral conductor 18, and a ground conductor 20 of wiring fault sensing circuit 110. Circuit 110 further includes an output line conductor 22 and an output neutral conductor 24 that can be coupled to a load.

In operation, if the connections of the AC supply system are sound (i.e., the line, neutral, and ground terminals of the AC supply system are properly connected), then the wiring fault correction circuit 110 connects the input line conductor 16 to output line conductor 22 and connects the input neutral conductor 18 to output neutral conductor 24 to thereby couple the correctly connected AC supply to the load. However, if the line, neutral, and ground conductors of the AC supply system are connected but the line and neutral conductors are reversed (i.e., the 120 Volt AC signal appears on the neutral conductor), a supply system fault condition is detected. In this case, the wiring fault correction circuit 110 connects the input line conductor 16 to the output neutral conductor 24 and connects the input neutral conductor 18 to the output line conductor 22, such that the 120 Volt AC signal is presented to the load on the output line conductor 22 despite the incorrect, reversed wiring of the AC supply system.

An important aspect of the wiring fault correction circuit is the use of four single pole, single throw (SPST) relays to separately make connections between the input line and neutral conductors and the output line and neutral conductors. Specifically, a first SPST relay $K_{A1}$ connects input line conductor 16 to output line conductor 22 when closed, and a second SPST relay $K_{A2}$ connects input neutral conductor 18 to output neutral conductor 24 when closed. SPST relays $K_{A1}$ and $K_{A2}$ are controlled by a first driver circuit 26 to connect the input line and neutral conductors 16, 18 to the output line and neutral conductors 22, 24, respectively, in response to detecting an AC voltage signal (e.g., 120 Vrms) on input line conductor 16 (i.e., a correct wiring condition).

A third SPST relay $K_{B1}$ connects input line conductor 16 to output neutral conductor 24 when closed, and a fourth SPST relay $K_{B2}$ connects input neutral conductor 18 to output line conductor 22 when closed. SPST relays $K_{B1}$ and $K_{B2}$ are controlled by a second driver circuit 28 to connect the input line and neutral conductors 16, 18 to the output neutral and line conductors 24, 22, respectively, in response to detecting an AC voltage signal (e.g., 120 Vrms) on input neutral conductor 18 (i.e., a reverse wiring condition).

As previously noted, the four single pole, single throw relays can be considered "independent" in the sense that each relay is uniquely associated with one input-to-output connection (i.e., the line-to-line, neutral-to-neutral, line-to-neutral, or neutral-to-line connection), and the state of each relay affects only its associated input-output connection and not the other relays or their associated input-output connections. Thus, the aforementioned problems with double pole, double throw relays and double pole, single throw relays are avoided. Such a wiring fault correction circuit meeting UL requirements can be constructed cost-effectively (e.g., commercially available SPST relays can handle 20 amps).

Referring again to FIG. 1, first driver circuit 26 is connected between input line conductor 16 and ground and includes a switching device $U_A$ which, when activated, supplies current to the relay coils of SPST relays $K_{A1}$ and $K_{A2}$ to energize the coils and close the SPST switches of relays $K_{A1}$ and $K_{A2}$. Specifically, the relay coils of $K_{A1}$ and $K_{A2}$ are arranged in series between the output terminal of switching device $U_A$ and input neutral conductor 18. A capacitor $C_{A2}$ is arranged in parallel across the relay coils to smooth the voltage across the coils.

First driver circuit 26 further includes circuitry for supplying a drive current to activate switching device $U_A$. Specifically, a diode $D_A$, a resistor $R_{A1}$, and a capacitor $C_{A1}$ are connected in series between input line conductor 16 and ground. First and second input terminals of switching device $U_A$ are connected in parallel across capacitor $C_{A1}$. That is, one of the input terminals of switching device $U_A$ is connected to ground, and the other input terminal is connected to a junction between capacitor $C_{A1}$ and resistor $R_{A1}$ via a second resistor $R_{A2}$. Diode $D_A$ ensures that only positive voltage is supplied to the switching device $U_A$ (the diode truncates the negative portion of the AC voltage signal). Resistors $R_{A1}$ and $R_{A2}$ (e.g., 47 kohms and 1 kohm, respectively) form a voltage divider circuit that substantially limits the current reaching switching device $U_A$. Capacitor $C_{A1}$ smoothes the half-wave voltage signal produced by diode $D_A$ and the resistors and essentially filters any ripple on the signal to provide a substantially DC voltage across the inputs of switching device $U_A$ so that switching device $U_A$ remains continuously activated while an AC voltage signal is present on input line conductor 16.

Importantly, since diode $D_A$, resistor $R_{A1}$, and capacitor $C_{A1}$ are connected between line and ground, any current that passes from input line conductor 16 through capacitor $C_{A1}$ constitutes a leakage current that must be maintained below a specified level to meet UL requirements. Consequently, switching device $U_A$ preferably requires a very low drive current while providing good isolation between input and output and also providing good current gain to ensure adequate current is supplied to energize the relay coils. An optical isolator circuit can be used as the switching device to meet these requirements. For example, as shown in FIG. 1, an optical isolator circuit comprising a photomos relay can be used as switching device $U_A$. The photomos relay includes an LED connected between the two input terminals, such that the voltage potential provided by capacitor $C_{A1}$ across the two input terminals supplies current to the LED, causing the LED to emit light. The photomos relay further includes a field effect transistor at the output with a light-sensitive gate. A diode $D_C$ and resistor $R_C$ are connected in series between one terminal of the FET and a junction between diode $D_A$ and resistor $R_{A1}$ and provide a voltage supply to the FET. The other terminal of the FET is connected to the relay coils of SPST relays $K_{A1}$ and $K_{A2}$. When light from the LED impinges on the gate of the FET, the FET turns on and supplies current to the relays coils to closed SPST relays $K_{A1}$ and $K_{A2}$ to respectively connect input line conductor 16 to output line conductor 22 and input neutral conductor 18 to output neutral conductor 24.

Photomos relays are particularly well suited for use in the wiring fault correction circuit of the present invention, since they require very little drive current and can be activated by leakage currents that meet UL requirements, they provide good current gain, and they are capable of switching 350 Vac thus providing good surge immunity and ruggedness.

While a photomos relay requires a low drive current that meets UL leakage current requirements, and provides excellent isolation and current gain, it will be appreciated that the invention is not limited to implementations with photomos relays. For example, other optical isolator circuits can be used for switching device $U_A$ and, more generally, switching device $U_A$ can be implemented with non-optical devices, such as a reed relay, a sensitive gate SCR, triac devices, or other mechanisms that provide adequate isolation and current gain.

The second driver circuit 28 includes the same components as first driver circuit 26 and essentially mirrors first driver circuit 26, but is connected between input neutral conductor 18 and ground, rather than between input line conductor 16 and ground, and controls SPST relays $K_{B1}$ and $K_{B2}$ rather than SPST relays $K_{A1}$ and $K_{A2}$. Specifically, second driver circuit 28 includes a switching device $U_B$ which, when activated, supplies current to the relay coils of SPST relays $K_{B1}$ and $K_{B2}$ to energize the coils and close the SPST switches of relays $K_{B1}$ and $K_{B2}$. The relay coils of $K_{B1}$ and $K_{B2}$ are arranged in series between the output terminal of switching device $U_B$ and input neutral conductor 18. A capacitor $C_{B2}$ is arranged in parallel across the relay coils to smooth the voltage across the coils.

Second driver circuit 28 further includes circuitry for supplying a drive current to activate switching device $U_B$. Specifically, a diode $D_B$, a resistor $R_{B1}$, and a capacitor $C_{B1}$ are connected in series between input neutral conductor 18 and ground. First and second input terminals of switching device $U_B$ are connected in parallel across capacitor $C_{B1}$. That is, one of the input terminals of switching device $U_B$ is connected to ground, and the other input terminal is connected to a junction between capacitor $C_{B1}$ and resistor $R_{B1}$ via a second resistor $R_{B2}$. Diode $D_B$ ensures that only positive voltage is supplied to the switching device $U_B$. Resistors $R_{B1}$ and $R_{B2}$ form a voltage divider circuit that substantially limits the current reaching switching device $U_B$, and capacitor $C_{B1}$ smoothes the voltage across the input terminals of switching device $U_B$ so that switching device $U_B$ remains continuously activated while an AC voltage signal is present on input neutral conductor 18. Power is supplied to switching device $U_B$ via the path containing diode $D_C$ and resistor $R_C$.

The AC supply system is properly wired when the ground terminal is connected, a potential at the neutral terminal remains substantially near ground potential, and an AC voltage signal is present at the line terminal, such that an alternating current potential exists across the line and neutral terminals of the AC supply system. An improper wiring exists if the line and neutral terminals are reversed. In this case, an alternating current potential is still present across the line and neutral terminals; however, the line terminal remains near ground potential while the AC voltage signal is present at the neutral terminal.

In operation, with a properly wired AC supply system, the first driver circuit 26 is activated by leakage current generated by the AC voltage signal present on input line conductor 16, which in turn drives first and second SPST relays $K_{A1}$ and $K_{A2}$ to respectively connect input line conductor 16 to output line conductor 22 and input neutral conductor 18 to output neutral conductor 24, thereby passing the properly wired signal onto the load equipment. Note that second driver circuit 28 is not activated under these conditions, since input neutral conductor 18 remains near ground potential and does not provide a drive current to switching device $U_B$.

Conversely, when the AC supply system is wired incorrectly, with the line and neutral terminals reversed, second driver circuit 28 is activated by leakage current generated by the AC voltage signal present on input neutral conductor 18, which in turn drives third and fourth SPST relays $K_{B1}$ and $K_{B2}$ to respectively connect input line conductor 16 to output neutral conductor 24 and input neutral conductor 18 to output line conductor 22, thereby correcting the reverse wiring condition by interchanging the line and neutral voltages and passing a properly wired signal onto the load equipment. Note that first driver circuit 26 is not activated under these conditions, since the input line conductor 16 remains near ground potential and does not provide a drive current to switching device $U_A$. Thus, by operation of the four SPST relays and the two driver circuits, the correct line and neutral signals are passed to the load equipment regardless of whether the AC supply system is wired properly or the line and neutral terminals are reversed.

In accordance with another aspect of the present invention, the wiring fault sensing circuit can be incorporated into a power filter system that includes other stages and circuits that provide comprehensive protection to a load by filtering an AC signal from a supply system in a variety of ways. For example, additional circuitry can be employed to control energy transients (surge suppression) and electromagnetic interference (EMI). Further, circuitry can be included to provide an indication of whether the power filter circuit is operating properly and/or whether the AC supply system wiring is sound (i.e., ground is connected, the neutral terminal remains substantially near ground potential, and the 120 Vrms AC voltage signal appears at the line terminal). By way of a non-limiting example, the wiring fault sensing circuit can be incorporated into a power filter system such as that disclosed in U.S. Pat. No. 5,136,455, the disclosure of which is incorporated herein by reference in its entirety. The power filter system described therein includes a diverter stage that absorbs the majority of any transient energy that appears between any two conductors (line, neutral, and ground), a clamping stage having a more rapid response time, which suppresses any residual transients that bypassed the diverter stage, and an impedance stage that suppresses EMI, such as RF interference (RFI). Further, a power filter system employing a wiring fault correction circuit can include an overvoltage protection circuit, such as that described in U.S. Pat. No. 6,040,969, the disclosure of which is incorporated herein by reference in its entirety.

Figure 2:
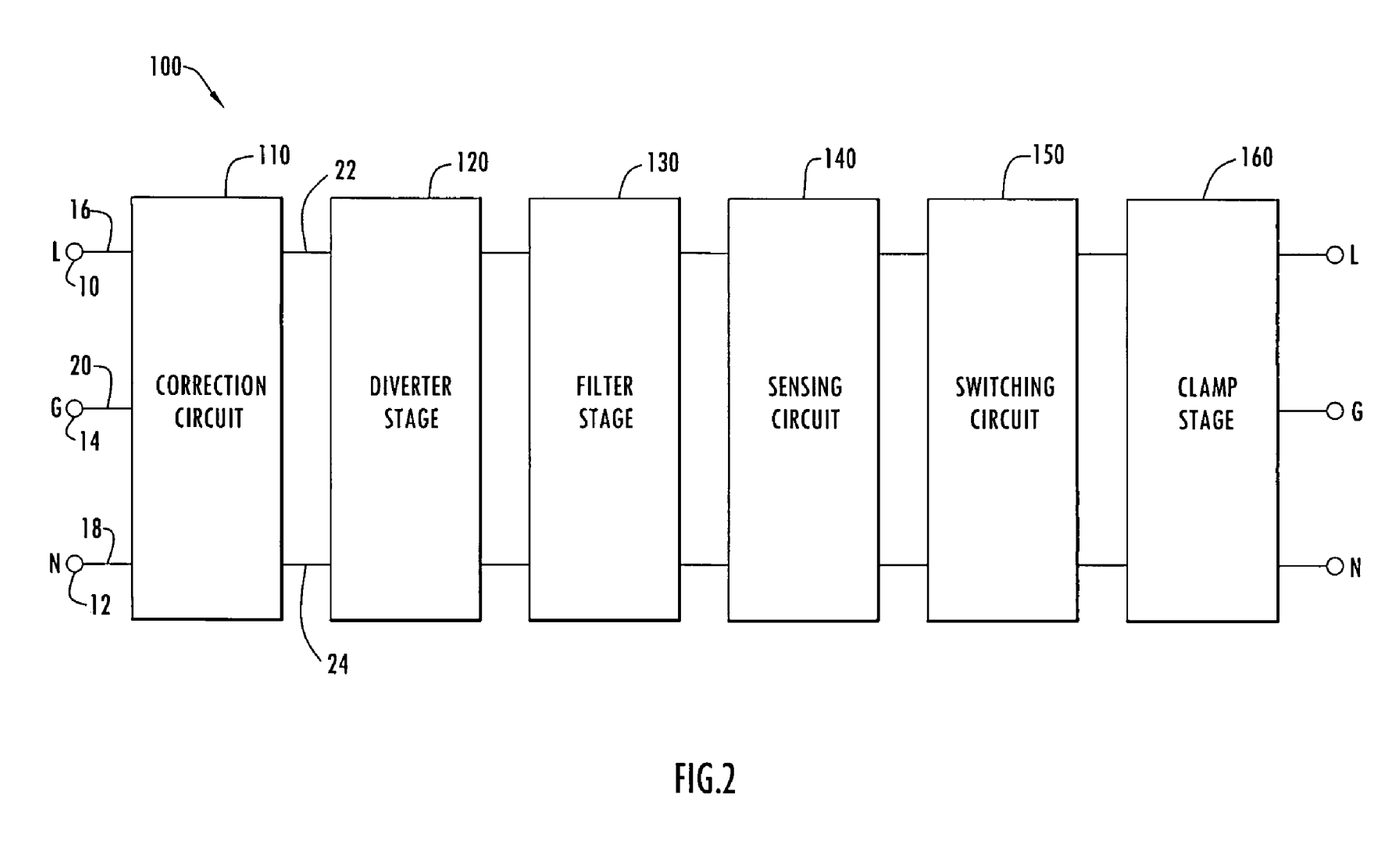
FIG. 2 is a block diagram of a power filter circuit including a wiring fault correction circuit according to an exemplary embodiment of the present invention.
Figure 3A:
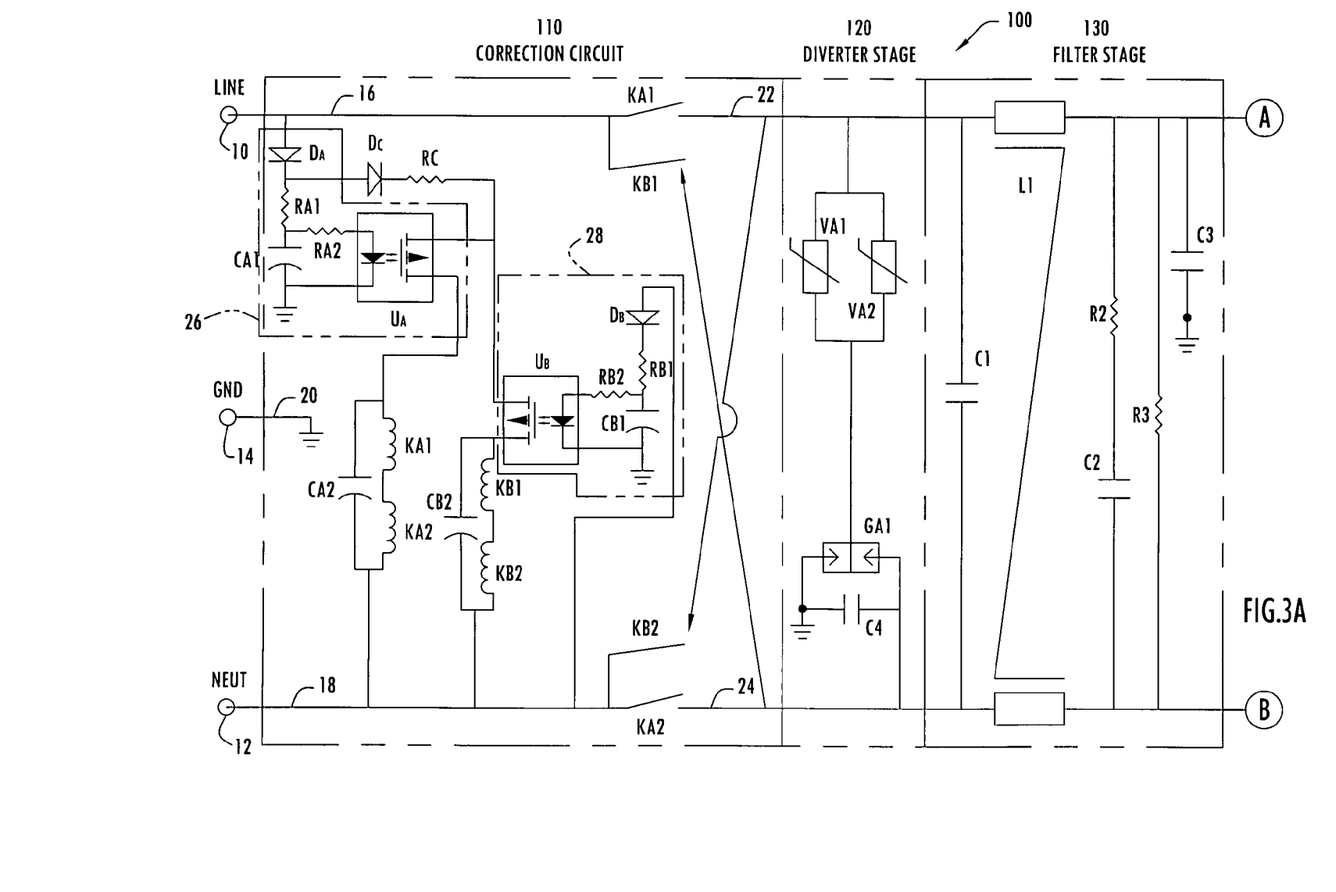
FIGS. 3A and 3B are a schematic circuit diagram of an exemplary embodiment of a power filter circuit according to the present invention, including the wiring fault correction circuit of FIG. 1.
Figure 3B:
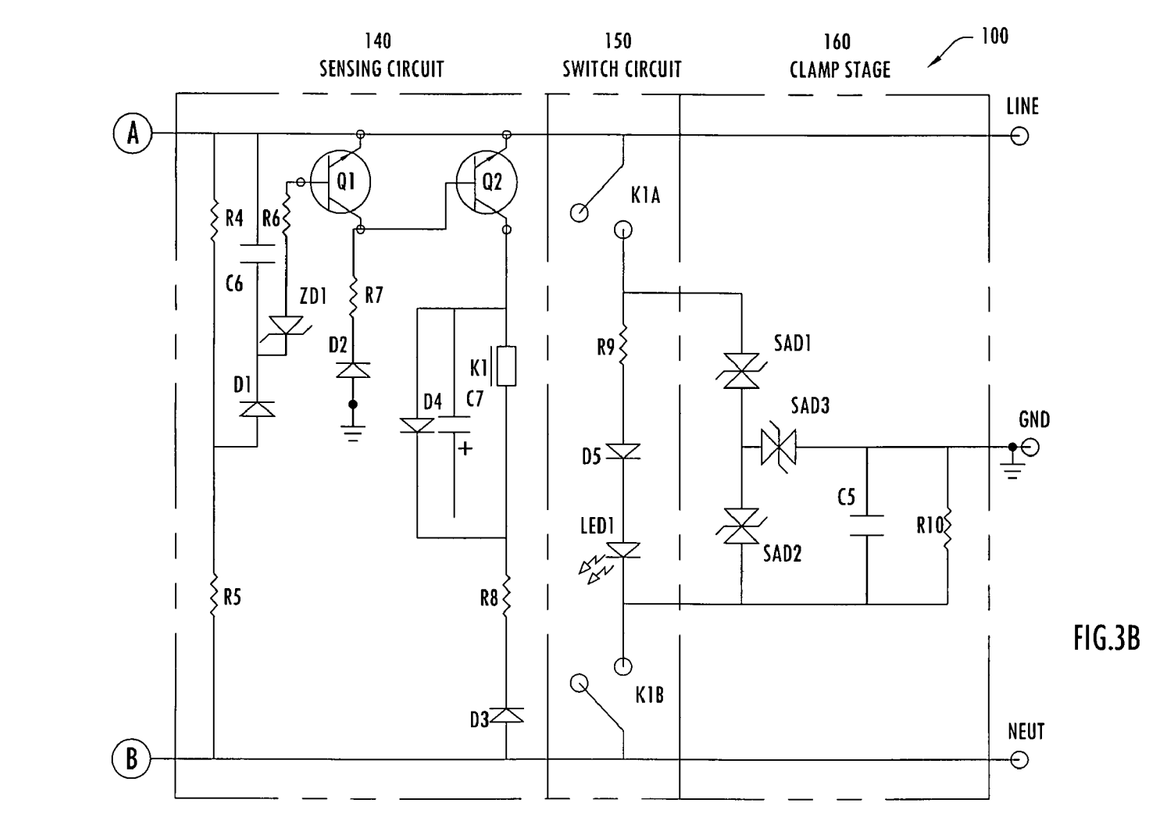

FIGS. 2, 3A, and 3B illustrate another exemplary embodiment of a power filter system of the present invention employing a wiring fault correction circuit having four single pole, single throw relays. FIG. 2 illustrates in block diagram form a power filter circuit 100 that includes the wiring fault correction circuit 110, a diverter stage 120, a filter stage 130, a sensing circuit 140, a switch circuit 150, and a clamp stage 160. The present invention is not limited to a power filter circuit that includes all of these stages, but preferably includes at least circuitry for suppressing energy transients and circuitry for suppressing EMI.

At one end of the power filter circuit 100, the line, neutral, and ground terminals 10, 12, and 14, in the form of a cord and male plug or other conventional mechanism, are configured to mate with terminals (e.g., a wall outlet) of the line, ground, and neutral terminals of an AC supply system, such as a single phase 120 Vrms supply circuit. The invention is not limited to operation with any particular AC supply system and includes implementations suitable for operation with any type of AC supply system, including those using different voltages, currents, and alternating current frequencies. At the other end of the power filter circuit 100, output line, neutral, and ground terminals are provided for connection to a load, such as a computer, a photocopier, or other electrical or electronic equipment. Here again, the output terminals can be any suitable mechanism, such as a female socket that receives a mating male plug from the load. Optionally, the power filter circuit can be built directly into the load equipment, such that the output conductors are directly coupled to the load equipment without use of terminals that can be disconnected.

An example of an implementation of diverter stage 120 is shown in FIG. 3A. Diverter stage 120 is downstream of correction circuit 110 and thus is connected to the output line and neutral conductors 22 and 24 rather than the input line and neutral conductors 16 and 18 directly connected to the AC supply. Diverter stage 120 includes two parallel varistors VA1, VA2 connected in series with a three-terminal gas tube arrester GA1 between the output line conductor 22 and the output neutral conductor 24. Specifically, one terminal of the gas tube is connected to the varistors, another terminal is connected to the output neutral conductor 24, and the third terminal is connected to ground. A capacitor C4 is connected in parallel with a capacitor C4 between neutral and ground. The diverter stage essentially diverts back to the source the majority of any excess transient energy between any two conductors, and can handle relatively high transient energy levels (i.e., high currents and/or voltages). Since the varistors are in series with the arrester, the relatively slow response time of the arrestor dictates that this implementation of the diverter stage be used only as the primary transient energy suppressor. Diverter stages are common in power filter systems, and other implementations can be employed.

A particular implementation of the filter stage 130 is also shown in FIG. 3A. Filter circuit 130, which is downstream of diverter stage 120, includes: a two-inch balun wound toroidal core inductor L1 around which the output line and neutral conductors are wound; a capacitor C1 connected between the output line and neutral conductors 22, 24 on the input side of inductor L1; a resistor R2 connected in series with a capacitor C2 between the output line and neutral conductors 22, 24 on the output side of inductor L1; a resistor R3 connected between the output line and neutral conductors 22, 24 on the output side of inductor L1; and a capacitor C3 connected between the output line conductor 22 and ground on the output side of inductor L1. Filter stage 130 essentially forms an LC circuit that suppresses normal mode electromagnetic interference and also provides isolation between the upstream diverter stage 120 and downstream clamp stage 160, thereby providing transient protection to clamp stage 160.

Optionally, a sensing circuit 140 and a switch circuit 150, can be employed downstream of filter stage 130. Sensing circuit 140 operates in a manner similar to the sensing circuit described in the aforementioned U.S. Pat. No. 6,040,969 to determine whether all three of the AC supply system conductors are connected (line, neutral, and ground) and whether the AC voltage signal appears on the line conductor. Since sensing circuit 140 is downstream of wiring fault correction circuit 110, the AC voltage signal should always be present on the output line conductor 22 unless the wiring fault correction circuit is malfunctioning or one of the AC supply terminals is not connected. Sensing circuit controls switch circuit 150, which illuminates a visible indictor when the AC supply system is properly connected.

An exemplary embodiment of a sensing circuit 140 and switch circuit 150 is shown in FIG. 3B. Sensing circuit 140 includes a resistor R4 in series with a resistor R5 connected between the output line and neutral conductors 22, 24. A diode D1 and a capacitor C6 are connected in series between the output line conductor 22 and a junction between resistors R4 and R5 (i.e., diode D1 and capacitor C6 are in parallel with resistor R4). A Zener diode ZD1 and resistor R6 are connected in series between the base of a bipolar transistor Q1 and a junction between diode D1 and capacitor C6. The emitter of the transistor Q1 is connected to the output line conductor 22, and the collector of Q1 is connected to the base of a second transistor Q2. A resistor R7 and diode D2 are connected in series between the collector of Q1 and ground. The emitter of the second transistor Q2 is also connected to output line conductor 22. A diode D4, capacitor C7, and relay K1 arranged in parallel are connected at one end to the collector of the second transistor Q2. A resistor R8 and diode D3 are connected in series between ground and the other end of the parallel diode D4, capacitor C7, and relay K1.

Relay K1 controls two switches K1A and K1B of switch circuit 150. Switch circuit 150 includes a resistor R9, a diode D5, and a light emitting diode LED1 arranged in series and connectable to output line conductor via switch K1A and to output neutral conductor via switch K1B. LED1 serves as an indicator that is visible from the exterior of a casing of the power filter circuit 100. When sensing circuit 140 determines that the AC supply system is properly connected, switches K1A and K1B are closed, such that LED1 is energized to provide a visible indication that the supply system is properly wired and the power filter circuit is operating properly.

An exemplary embodiment of a clamp stage 160, located downstream of switch circuit 150, is shown in FIG. 3B. The clamp stage 160 includes three TVS diodes (e.g., 1.5 KE150CA) SAD1, SAD2, SAD3, a capacitor C5, and a resistor R10. TVS diodes SAD1 and SAD2 are connected in series between output line and neutral conductors 22, 24 when switches K1A and K1B of switch circuit 150 are closed. TVS diode SAD3 is connected between ground and a junction between TVS diodes SAD1 and SAD2. Capacitor C5 and resistor R10 are connected in parallel between ground and output neutral conductor 24 (assuming switch K1B is closed). Due to the rapid response times of the TVS diodes, clamp stage 160 is capable of clamping any transient excess energy that bypasses diverter stage 120 before the transient energy reaches the load equipment. Clamp stage 160 can also quickly clamp any transients that occur at the load, such as spikes caused by catastrophic equipment failure or electrically noisy equipment, so that such noise or spikes are not introduced into the source network.

It will be understood that use of the wiring fault correction circuit of the present invention within a complete power filter system is not limited to the particular system shown in FIGS. 3A and 3B, and other power filter circuit components and arrangements can be used in conjunction with the wiring fault correction circuit of the present invention.

Further, it should be understood that the use of a diverter stage, a filter stage, a sensing circuit, a switch circuit, and a clamp stage, as described, in the exemplary power filter system is not meant to limit the components or any arrangement of components that can be used in a conjunction with the wiring fault correction circuit of the present invention. Moreover, the particular design of the components is not meant to limit the design of the various components.

Having described preferred embodiments of a wiring fault correction circuit and a power filter system employing a wiring fault correction circuit, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed:

1. A wiring fault correction circuit for determining wiring conditions of an AC supply system, comprising:
    input line and neutral conductors configured to be coupled to the AC supply system;
    output line and neutral conductors configured to be coupled to a load;
    first, second, third, and fourth single pole, single throw relays;
    a first driver that controls the first and second single pole, single throw relays to respectively connect the input line conductor to the output line conductor and the input neutral conductor to the output neutral conductor in response to a conectly wired AC supply system, wherein the first driver circuit comprises:
        a first diode, a first resistor, and a first capacitor connected in series between the input line conductor and ground;
        a switching device having first and second input terminals connected in parallel with the first capacitor and an output terminal coupled to relay coils of the first and second single pole, single throw relays; and a second resistor connected at one end between the first resistor and the first capacitor and at the other end to the first input terminal of the switching device, wherein the first diode, first capacitor, and first and second resistors supply a leakage current that activates the switching device in response to an AC voltage signal on the input line conductor, whereby the switching device activates the first and second single pole, single throw relays; and a second driver circuit that controls the third and fourth single pole, single throw relays to respectively connect the input line conductor to the output neutral conductor and the input neutral conductor to the output line conductor in response to an incorrectly wired AC supply system in which line and neutral conductors of the AC supply system are reversed.

2. The circuit of claim 1, wherein:

the first driver circuit comprises a first switching device configured to energize relay coils of the first and second single pole, single throw relays in response to an AC voltage signal on the input line conductor; and the second driver circuit comprises a second switching device configured to energize relay coils of the third and fourth single pole, single throw relays in response to an AC voltage signal on the input neutral conductor.

3. The circuit of claim 2, wherein the AC voltage signal is a 120 Volt AC signal.

4. The circuit of claim 2, wherein:

the first driver circuit further comprises a first voltage divider circuit connected between the input line conductor and ground and configured to activate the first switching device to energize the relay coils of the first and second single pole, single throw relays in response to an AC voltage signal on the input line conductor; and the second driver circuit further comprises a second voltage divider circuit connected between the input neutral conductor and ground and configured to activate the second switching device to energize the relay coils of the third and fourth single pole, single throw relays in response to an AC voltage signal on the input neutral conductor.

5. The circuit of claim 2, wherein the first and second switching devices are optical isolator circuits.

6. The circuit of claim 5, wherein the optical isolator circuits comprise photomos relays.

7. The circuit of claim 6, wherein the photomos relays each comprise a light emitting diode and a field effect transistor activated by the light emitting diode in the presence of a leakage current.

8. The circuit of claim 1, further comprising:

a second diode and a third resistor connected in series between the input line conductor and the switching circuit to provide a supply voltage signal to the switching circuit.

9. The circuit of claim 1, wherein the second driver circuit comprises:

a first diode, a first resistor, and a first capacitor connected in series between the input neutral conductor and ground;

a switching device having first and second input terminals connected in parallel with the first capacitor and an output terminal coupled to relay coils of the third and fourth single pole, single throw relays; and a second resistor connected at one end between the first resistor and the first capacitor and at the other end to the first input terminal of the switching device, wherein the first diode, first capacitor, and first and second resistors supply a leakage current that activates the switching device in response to an AC voltage signal on the input neutral conductor, whereby the switching device activates the third and fourth single pole, single throw relays.

10. The circuit of claim 9, further comprising:

a second diode and a third resistor connected in series between the input line conductor and the switching circuit to provide a supply voltage signal to the switching circuit.

11. An AC power filter circuit, comprising:

the wiring fault correction circuit of claim 1;

a diverter stage configured to suppress transient excess energy;

an electromagnetic interference suppression stage configured to suppress electromagnetic interference; and a clamping stage configured to suppress residual transient excess energy.

* * * * *

UNITED STATES PATENT AND TRADEMARK OFFICE
CERTIFICATE OF CORRECTION

PATENT NO. : 7,551,412 B2
APPLICATION NO. : 11/429435
DATED : June 23, 2009
INVENTOR(S) : Peter Winch

Page 1 of 1

It is certified that error appears in the above-identified patent and that said Letters Patent is hereby corrected as shown below:

Column 10, line 61, replace "a conectly wired" with -- a correctly wired --.

Signed and Sealed this

Sixth Day of October, 2009

David J. Kappos
*Director of the United States Patent and Trademark Office*